Aug. 14, 1951  F. E. JOHNSON  2,564,645
LOCKING NUT
Filed Oct. 10, 1945

Inventor
Frank E. Johnson.
By Walter S. Jones
Attorney

Patented Aug. 14, 1951

2,564,645

UNITED STATES PATENT OFFICE 2,564,645

LOCKING NUT

Frank E. Johnson, Malden, Mass., assignor to United-Carr Fastener Corporation, Cambridge, Mass., a corporation of Massachusetts Application October 10, 1945, Serial No. 621,422

4 Claims. (Cl. 151—21)

The present invention relates to locking nuts and more particularly to that type of locking nut provided with axially spaced screw-receiving threaded portions providing a locking action affected by a force exerted axially on a screw engaged therein and aims generally to improve and simplify prior locking nuts of that type.

One of the primary objects of the invention is the provision of a nut having axially spaced threaded barrel portions and an intermediate anchoring flange for anchoring the nut to a supporting structure.

A further object of the invention is the provision of a locking nut having axially spaced screw-receiving portions normally out of phase with respect to each other and provided with an intermediate flange serving as an integral washer for bearing engagement with a support.

Other aims and objects of the invention are to improve and simplify the construction of such locking nuts as will be apparent to persons skilled in the art from a consideration of the accompanying drawings and annexed specification illustrating and describing preferred embodiments of the invention.

Referring more particularly to the drawings, the improved locking nut comprises a load-bearing nut portion 10 and a screw-receiving locking portion 20 normally axially spaced therefrom.

Figure 1:
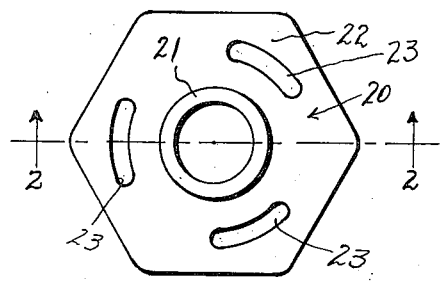
Fig. 1 is a top plan view of my improved locking nut.
Figure 2:
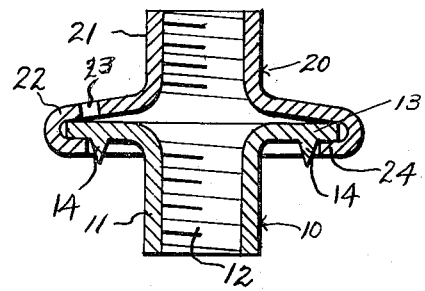
Fig. 2 is a vertical sectional view of my improved locking nut device taken on the line 2—2 of Fig. 1.
Figure 3:
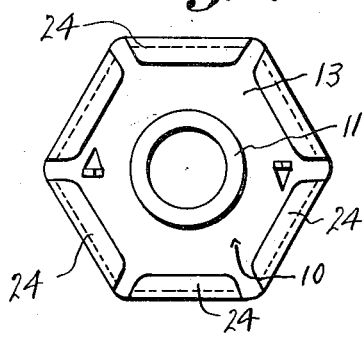
Fig. 3 is a bottom plan view of the locking nut.
Figure 6:
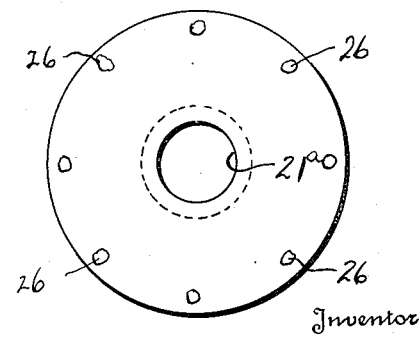
Fig. 6 is a top plan view of the locking nut shown in Fig. 5.

The load-bearing nut portion 10 is advantageously formed of relatively stiff sheet metal and is provided with a tubular barrel 11 internally threaded as at 12 and a laterally projecting flange 13 at one end thereof. The flange 13 is normally disposed in a plane normal to the axis of the barrel 11 and provides a relatively large support-bearing surface, thus serving as a washer for the nut portion 10. If desired, the flange may be formed with support-engaging prongs 14 adapted to bite into the support as a screw is tightened in the nut, in which case the flange serves as an anchoring base for the nut 10. The flange 13 may be of any desired shape such as polygonal, as shown in Figs. 1 and 3, or circular as shown in Fig. 6.

The screw-receiving locking portion 20 preferably comprises an internally threaded screw-receiving sleeve 21 of the same diameter as the nut barrel 11, though it need not be as long as the nut barrel as the latter carries substantially all of the load of the fastening in use. The sleeve is formed at one end thereof with an outwardly dished flange 22 providing an attaching cap whereby the locking portion may be attached to the flange 13 of the nut portion 10. The flange 22 is dished sufficiently to permit slight axial movement of the sleeve 21, toward and from the nut portion 10, and segments 23 may be cut out of the flange 22 to increase the resilience thereof.

The locking portion 20 may be attached to the flange of the nut in any suitable manner. As is illustrated in Figs. 1 to 4 the peripheral edge of the cap 22 may be formed with attaching fingers 24 crimped or clenched around the peripheral edge of the nut flange 13. Alternatively, the cap may be spot welded to the flange as illustrated at 26 in Figs. 5 and 6.

After the nut 10 and locking portion 20 have been assembled, I preferably displace the sleeve portion 21 axially of the nut barrel so as to place the threads of the locking sleeve out of phase with the threads of the nut to increase the locking action of the nut.

Figure 5:
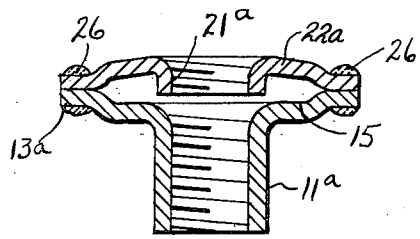
Fig. 5 is a vertical sectional view similar to Fig. 1 illustrating a modified form of locking nut.

A modified form of the invention is illustrated in Figs. 5 and 6 wherein the locking sleeve 21ª may project inwardly from the attaching cap or flange 22ª to provide a locking nut suitable for a flush type mounting. If desired, the flange 13ª of the nut portion 10 may be dished as at 15 to provide sufficient space for axial movement of the locking sleeve 21ª toward the barrel 11ª.

Figure 4:
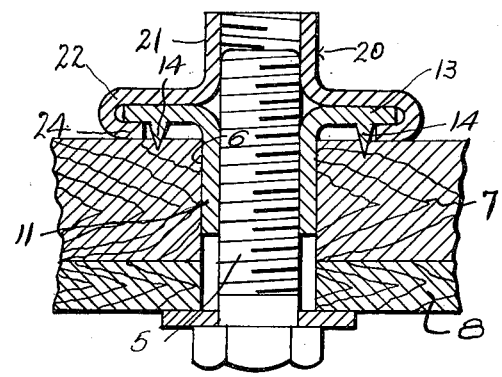
Fig. 4 is a longitudinal sectional view similar to Fig. 1 showing the completed assembly of nut, bolt and member secured thereby.

The locking nut is intended for use with a conventional screw 5 as illustrated in Fig. 4. In such installation the barrel 11 of the nut may be positioned in an aperture 6 of a support 7 against which an aperture part 8 to be secured to the support 7 is placed.

The screw passed through the apertures of the support 7 and part 8, first threadedly engages the threads of the barrel 11 and later engages the threads of the locking sleeve 21—21ª. As the threads of the locking sleeve are out of phase with the threads of the barrel 11, continued rotation of the screw 5 will displace the locking sleeve 21 axially away from the barrel 11 against the tension of the resilient cap or flange 21, thus imposing a locking thrust on the threads of the screw in an axial direction to effectively resist rotation of the screw in unfastening direction.

The locking nut of the present invention is a simple construction and economical of manufacture. The load-bearing nut portion 10 and the locking portion 20 are similar in construction and may be readily manufactured and threaded prior to assembly. It has the advantage of providing an anchoring base or support-bearing flange intermediate the nut barrel 10 and the locking sleeve 20 whereby the nut barrel may be positioned in an aperture of the support with only a minor portion of the locking nut extending beyond the face of the support.

Although I have illustrated and described two preferred forms of my invention, I do not wish to be limited thereby because the scope of my invention is best defined by the following claims.

I claim:

1. A nut device for screw-threaded fastenings comprising two similarly threaded axially spaced barrel portions and means yieldably retaining the threads thereof normally out of phase, said means including a substantially rigid radially projecting flange on one of said barrel portions and a yieldable radially projecting flange on the other of said barrel portions, and peripherally united to said first mentioned flange, said flanges being disposed on the adjacent opposing ends of said barrel portions, and said rigid flange having support-engaging portions disposed around the axis of said barrel portions on the face thereof opposite the other of said barrel portions.

2. A nut device for screw-threaded fastenings comprising two similarly threaded axially spaced barrel portions and disc-like flanges extending laterally from adjacent ends of said barrel portions for maintaining said barrel portions in coaxial spaced relation, one of said barrel portions being displaceable axially away from the other against the tension of its flange, said flanges being disposed on the adjacent opposing ends of said barrel portions, and the other one of said flanges having support-engaging portions disposed around the axis of said barrel portions on the face thereof opposite said one flange.

3. A nut device for screw-threaded fastenings comprising a nut body having a threaded barrel and a laterally projecting annular flange, a resilient diaphragm marginally secured to said flange, and a second similarly threaded barrel mounted on said diaphragm and axially spaced from said first mentioned barrel, the threads of said barrels being normally out of phase, said flange and said diaphragm being disposed on the adjacent opposing ends of said barrels, and said flange having support-engaging portions disposed around the axis of said barrels on the face thereof opposite said diaphragm.

4. A sheet metal threaded locking device comprising two similarly axially spaced internally threaded sheet metal portions, a support-engaging flange on one of said internally threaded portions and disposed in a plane between said threaded portions, and resilient means integral with the other threaded portion and connected to said flange radially beyond said first mentioned threaded portion, said flange being disposed on the end of said one internally threaded portion adjacent the opposing end of the other of said internally threaded portions and having support-engaging portions disposed around the axis of said threaded portion on a face thereof opposite said resilient means.

FRANK E. JOHNSON.

REFERENCES CITED

The following references are of record in the file of this patent:

UNITED STATES PATENTS

| Number | Name | Date |
| --- | --- | --- |
| 1,919,940 | Hall | July 25, 1933 |
| 2,102,558 | Johnson | Dec. 14, 1937 |
| 2,196,637 | Luce | Apr. 9, 1940 |
| 2,215,560 | Oddie | Sept. 24, 1940 |
| 2,375,325 | Robertson | May 8, 1945 |
| 2,376,927 | Luce | May 29, 1945 |
| 2,381,936 | Sargent | Aug. 14, 1945 |
| 2,389,122 | Churchill | Nov. 20, 1945 |
| 2,400,318 | Rosan | May 14, 1946 |